United States Patent [19]

Holtam et al.

[11] 4,133,209

[45] Jan. 9, 1979

[54] ALTIMETER

[75] Inventors: John R. Holtam, Stroud; Donald J. Ford, Cheltenham, both of England; Roger A. Freeman, Clearwater, Fla.

[73] Assignee: Smiths Industries Limited, London, England

[21] Appl. No.: 831,021

[22] Filed: Sep. 6, 1977

[30] Foreign Application Priority Data

Sep. 3, 1976 [GB] United Kingdom ............... 36693/76

[51] Int. Cl.$^2$ .............................................. G01L 7/12
[52] U.S. Cl. .................................................... 73/387
[58] Field of Search ........................ 73/387, 386, 384

[56] References Cited

U.S. PATENT DOCUMENTS

| 2,260,541 | 10/1941 | Schwenn | 73/387 |
| 3,191,439 | 6/1965 | Johanson | 73/387 |
| 3,242,737 | 3/1966 | De Grande et al. | 73/387 |
| 3,668,933 | 6/1972 | Blom-Bakke | 73/387 |
| 3,977,250 | 8/1976 | Amlie | 73/386 |

*Primary Examiner*—Donald O. Woodiel
*Attorney, Agent, or Firm*—Pollock, VandeSande and Priddy

[57] ABSTRACT

An instrument for providing an altitude representation in accordance with ambient atmospheric pressure has a mechanism that is manually-operable to effect adjustment to the setting of a datum against which the representation is provided. A mechanical feedback is applied to the mechanism in accordance with the datum setting such that the setting of the datum depends both upon the manual operation of the mechanism and the feedback applied to the mechanism as a result of that manual operation. The mechanism may include a worm gear that is rotatable in accordance with manual operation of the mechanism in which case the feedback is introduced into the mechanism by longitudinally displacing the worm gear.

11 Claims, 3 Drawing Figures

ALTIMETER

This invention relates to instruments for providing an output representation in accordance with an input variable.

The invention is in particular concerned with instruments of the kind in which provision is made for adjusting the setting of a datum against which the output representation is to be provided. More especially the invention is concerned with circumstances in which it is necessary to effect the adjustment to the datum setting in accordance with a non-linear law. Such circumstances arise, for example, in barometric altimeters as used in aircraft, where it is required to effect adjustment of the datum against which altitude is indicated, in dependence upon variations in atmospheric air-pressure at sea-level or at some other specific location.

According to one aspect of the present invention an instrument for providing an output representation in accordance with an input variable, includes a mechanism that is operable to effect adjustment to the setting of a datum against which said representation is provided, and means for applying feedback to said mechanism in accordance with the datum setting whereby the setting of said datum resulting from operation of said mechanism is dependent both upon that operation and the feedback applied as a consequence thereof.

The said instrument may include a gear that serves to determine the setting of said datum, and said mechanism may then include a worm that engages with the gear to drive it in accordance with a manually-applied rotation of the worm. In these circumstances the said feedback may be provided from the gear by means (which may for example include a cam) that is arranged to effect longitudinal displacement of the worm relative to the gear so as further to drive the gear.

Preferably, the instrument includes a differential gear mechanism having a first input which is driven in accordance with the said input variable, and a second input which is constituted in part by the said gear. The output representation may be arranged to be varied in accordance with an atmospheric pressure-related input variable, and the worm may be manually rotated in accordance with a selected atmospheric pressure value.

An instrument in accordance with this invention and in the form of an aircraft altimeter will now be described, by way of example, with reference to the accompanying drawings, in which.

The altimeter to be described is a mechanical counter-pointer instrument containing an aneroid-capsule mechanism. Capsule deflections caused by changes in ambient pressure are amplified by a system of linkages and gears and transmitted to a pointer shaft and to a drum counter. Changes in altitude of an aircraft carrying the instrument are accompanied by changes in ambient pressure, and thus cause movement of the pointer over a scale plate and rotation of the drum counter. The linkages and gear train incorporate in their design the mathematical relationship between ambient pressure and altitude, so that the scale plate and drum counter can be graduated in terms of altitude in feet.

Figure 1:
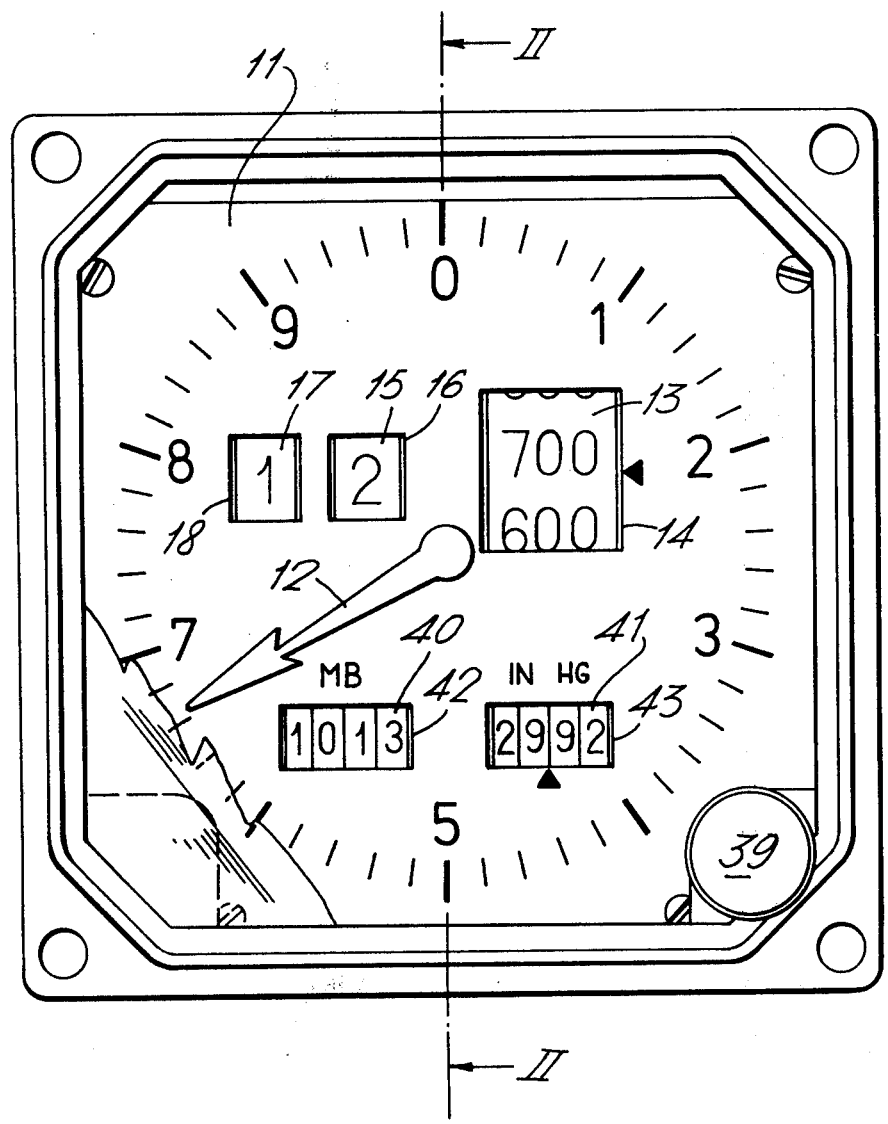
FIG. 1 shows the face of the altimeter.

Referring to FIG. 1, the scale plate 11 has a circular scale divided into ten equal segments (each representative of 100 feet of altitude) and graduated from 0 to 9. Each segment is sub-divided into five sections each representative of 20 feet of altitude. For every 1000-foot change in altitude the pointer 12 makes one revolution around the scale 11. For the same change in altitude a drum 13 located behind the scale plate 11 also makes one revolution. The drum 13 is visible through an aperture 14 in the scale plate and carries ten equi-spaced graduations increasing from 000 to 900 in steps of 100. Two further drums 15 and 17 visible through respective apertures 16 and 18 and graduated from 0 to 9, indicate thousands of feet and tens of thousands of feet respectively.

Thus the drum counter provides an indication of the total altitude and the pointer indicates hundreds and tens of feet with a greater degree of resolution.

Figure 2:
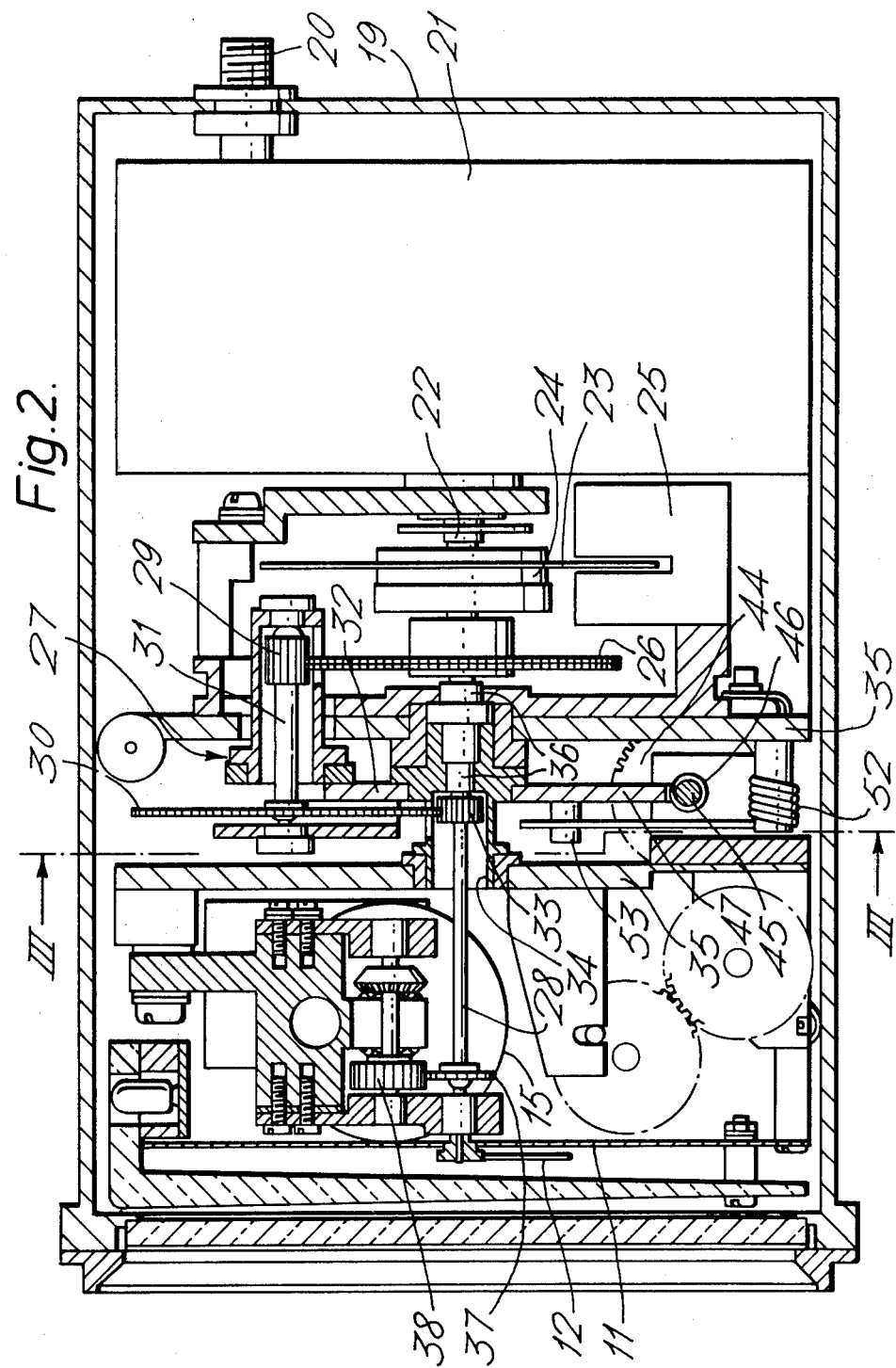
FIG. 2 is a part-sectional side view taken along the line II—II of FIG. 1.

The internal mechanism of the altimeter is shown in FIG. 2.

Referring to FIG. 2, a casing 19 of the altimeter is hermetically sealed and is provided with an inlet union 20. In use the inlet union 20 is connected by a pipe to the exterior of the aircraft so that the interior of the instrument is at the ambient pressure outside the aircraft.

A conventional aneroid unit 21, containing one or more evacuated capsules (not shown), provides a representation of the ambient pressure (and therefore of the altitude) in terms of the angular position of an output shaft 22.

An optical encoding disc 23 is rotated by the output shaft 22 via a gear mechanism 24 and its angular position is sensed by a photo-detector unit 25 to provide a digital signal representative of the aircraft altitude for use by automatic altitude-reporting equipment.

The output shaft 22 also carries an anti-backlash gearwheel 26 which forms part of a differential 27 for transmitting rotation of the output shaft 22 to a shaft 28 carrying the pointer 12. As well as the gearwheel 26, the differential includes a pinion 29 and a gearwheel 30 mounted on a shaft 31 journalled in a planetary frame 32, and a pinion 33 mounted on the pointer shaft 28. The gearwheel 26 meshes with the pinion 29, and the gearwheel 30 meshes with the pinion 33. In addition, the planetary frame 32 is mounted on a hollow spindle 34 for angular displacement relative to plates 35 which are fixed to the casing 19 and in which the spindle 34 is journalled. The spindle 34 carries within it bearings 36 for the shafts 22 and 28.

A second pinion 37 on the pointer shaft 28 meshes with a pinion 38 which drives the counter drums 13, 15 and 17.

Thus the reading provided by the pointer 12 and the drums 13, 15 and 17 is a function both of the angular position of the output shaft 22 and of the angular position of the planetary frame 32.

Movement of the planetary frame 32 enables the altimeter reading to be adjusted to compensate for climatic (as against altitude-related) changes in atmospheric pressure. Referring to FIG. 1, a knob 39 is provided on the face of the instrument, and is coupled by gearing (not shown) to counters 40 and 41. These counters 40 and 41 are visible through apertures 42 and 43 in the scale plate 11, and indicate, in millibars and inches of mercury respectively, the barometric pressure corresponding to the zero-altitude setting of the altimeter.

Figure 3:
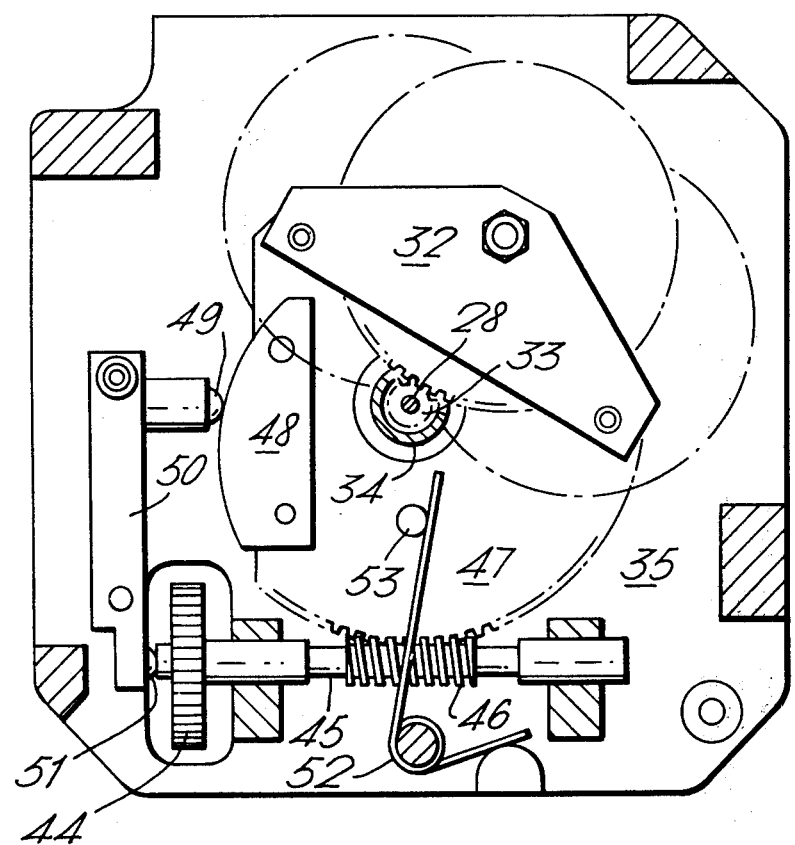
FIG. 3 is a sectional view taken along the line III—III of FIG. 2.

The knob 39 is also coupled by the gearing to a gearwheel 44 (see FIGS. 2 and 3). The gearwheel 44 is carried by a shaft 45 which also carries a worm 46 meshing with a sector gear 47 forming part of the planetary frame 32.

Thus rotation of the knob 39 by a member of the aircrew causes angular displacement of the planetary frame 32, thereby altering the reading provided by the pointer 12 and the drums 13, 15 and 17. At the same time the counters 40 and 41 change their readings to provide a continuous indication of the zero-altitude pressure to which the altimeter is set.

In known altimeters the law relating change in altitude to change in ambient atmospheric pressure is introduced into the adjustment effected by the knob 39 by means of a snail cam. The snail cam is rotated by the knob, and a cam follower on the planetary frame bears on the cam surface. The shape of the cam surface defines the required law.

However, the altimeter shown in the drawings does not use a snail cam. Instead, the planetary frame 32 carries a cam segment 48 engaged by a cam follower 49 at one end of a lever 50 which is pivoted on the rear of one of the two plates 35. The other end of the lever 50 has a protrusion 51 which bears on one end of the shaft 45. This shaft 45 is slidably mounted on the front one of the plates 35 so that, as the sector gear 47 (and therefore the planetary frame 32) is angularly displaced by rotation of the worm 46, the shaft 45 is displaced sideways by the cam segment 48 acting via the lever 50, thereby causing additional angular displacement of the planetary frame 32. The extent of this additional displacement depends on the shapes of the cam segment 48, the cam follower 49 and the protrusion 51 on the lever 50. Thus the desired relationship between rotation of the knob 39 and change in altimeter reading can be obtained by control of the shapes of these parts.

Positive engagement between the cam segment 48 and the cam follower 49 and between the protrusion 51 and the shaft 45 is assured by the action of a coil spring 52 acting on a pin 53 on the sector gear 47.

The cam segment 48 is simpler to manufacture than the snail cam used in known altimeters, and need not be made to the same high degree of accuracy as such snail cams. By way of example, a change of one thousandth of an inch in the radial dimension of a typical snail cam causes a change in altimeter reading of 35 feet. In contrast, the same change in the case of the cam segment 48 causes a change in reading of only 5 feet. Thus, a small error in the dimensions of the cam segment 48 has a much smaller effect on the altimeter reading than would the same error in the case of a snail cam.

With the curved cam segment 48 shown in FIG. 3, the altimeter can be adjusted for a minimum barometric pressure of 700 millibars. However, if the instrument need not be adjusted for pressure less than 800 millibars, it is possible to obtain the desired law relating pressure setting and altitude reading with a straight edge on the cam segment 48. This simplifies manufacture still further.

We claim:

1. An instrument for providing an output representation in accordance with an input variable, including means responsive to said input variable, a differential having one input which is coupled to said responsive means and an output which provides said output representation, a mechanism which cooperates with a second input of said differential and which is manually operable to effect adjustment to the setting of a datum against which said representation is provided, and mechanical feedback means operatively connected between said second input of said differential and said mechanism for applying mechanical feedback to said mechanism further to operate said mechanism in accordance with the datum setting so that the setting of said datum resulting from manual operation of said mechanism is dependent both upon that manual operation and the feedback applied to said mechanism as a consequence thereof.

2. An instrument according to claim 1 wherein said second input of said differential includes a gear that serves to determine the setting of said datum, and wherein said mechanism includes a worm that engages with the gear to drive said gear in accordance with a manually-applied rotation of said worm.

3. An instrument according to claim 2 wherein said mechanical feedback means is operative to effect longitudinal displacement of said worm relative to said gear so as further to drive the gear in accordance with displacement of said gear as a result of said manually-applied rotation of the worm.

4. An instrument according to claim 3 wherein said mechanical feedback means includes a cam assembly through which said feedback is transmitted to the worm.

5. An instrument according to claim 4 wherein a cam of said cam assembly is carried with the said gear.

6. An instrument according to claim 5 wherein said mechanical feedback means further includes a pivoted lever which carries a cam follower for engagement with said cam, said lever being arranged to effect said longitudinal displacement of said worm in accordance with displacement of said cam.

7. An altimeter for providing an output representation of height in accordance with ambient atmospheric pressure including means responsive to said ambient atmospheric pressure, a differential having one input which is coupled to said pressure responsive means and an output which provides said output representation of height, a mechanism which cooperates with a second input of said differential and which is manually operable to effect adjustment to the setting of a barometric pressure related datum against which said output representation is provided, and mechanical feedback means operatively connected between said second input of said differential and said mechanism for applying mechanical feedback to said mechanism further to operate said mechanism in accordance with the barometric pressure related datum setting so that the setting of said datum resulting from manual operation of said mechanism is dependent both upon that manual operation and the feedback applied to said mechanism as a consequence thereof.

8. An altimeter according to claim 7 wherein said second input of said differential includes a gear that serves to determine the setting of said datum, and wherein said mechanism includes a worm which engages with said gear and a knob which is arranged to rotate said worm in accordance with a manually-applied rotation of said knob thereby to drive said gear.

9. An altimeter according to claim 8 wherein said mechanical feedback means is operative to effect longitudinal displacement of said worm relative to said gear in accordance with displacement of said gear as a result of said manually-applied rotation of the worm so as further to drive said gear.

10. An altimeter according to claim 9 including indicating means which is arranged to provide an indication of datum barometric pressure in accordance with manually-applied rotation of said knob.

11. An altimeter according to claim 10 including further indicating means which is coupled to said output from the differential to provide a visual indication of said output representation of height.

* * * * *